US009129432B2

(12) United States Patent
Quan et al.

(10) Patent No.: US 9,129,432 B2
(45) Date of Patent: Sep. 8, 2015

(54) IMAGE-BASED PROCEDURAL REMODELING OF BUILDINGS

(75) Inventors: Long Quan, Hong Kong (CN); Peng Zhao, Hong Kong (CN); Tian Fang, Hong Kong (CN); Honghui Zhang, Hong Kong (CN)

(73) Assignee: The Hong Kong University of Science and Technology, Kowloon (HK)

( * ) Notice: Subject to any disclaimer, the term of this patent is extended or adjusted under 35 U.S.C. 154(b) by 260 days.

(21) Appl. No.: 13/010,193

(22) Filed: Jan. 20, 2011

(65) Prior Publication Data

US 2011/0181589 A1    Jul. 28, 2011

Related U.S. Application Data

(60) Provisional application No. 61/282,351, filed on Jan. 28, 2010.

(51) Int. Cl.
*G06T 17/05*    (2011.01)

(52) U.S. Cl.
CPC ............ *G06T 17/05* (2013.01); *G06T 2210/04* (2013.01)

(58) Field of Classification Search
USPC ........................................................ 345/420
See application file for complete search history.

(56) References Cited

U.S. PATENT DOCUMENTS

| 2006/0239539 | A1* | 10/2006 | Kochi et al. | 382/154 |
| 2010/0214291 | A1* | 8/2010 | Muller et al. | 345/420 |

OTHER PUBLICATIONS

Xiao, J., Fang, T., Tan, P., Zhao, P., Ofek, E., Quan, L. 2008. "Image-based Façade Modeling." ACM Trans. Graph. 27, 5, Article 161 (Dec. 2008).*
Feng Han; Song-Chun Zhu; , "Bottom-Up/Top-Down Image Parsing with Attribute Grammar," Pattern Analysis and Machine Intelligence, IEEE Transactions on , vol. 31, No. 1, pp. 59-73, Jan. 2009.*
Müller, Pascal, et al. Procedural modeling of buildings. vol. 25. No. 3. ACM, 2006.*
Früh, Christian, and Avideh Zakhor. "Constructing 3D City Models by Merging Aerial and Ground Views." IEEE Computer Graphics and Applications 23.6 (2003): 52-61.*
Harris, et al., "A Combined Corner and Edge Detector". © The Plessey Company plc. 1988. Last accessed Jan. 6, 2011, 6 pages.
John Canny, A Computational Approach to Edge Detection. IEEE Transactions on Pattern Analysis and Machine Intelligence, vol. PAMI-8, No. 6, Nov. 1986. © 1986 IEEE. Last accessed Jan. 6, 2011, 20 pages.
Curless, et al., "A Volumetric Method for Building Complex Models from Range Images". Last accessed Jan. 6, 2011, 10 pages.
Mark Pauly, et al., "Discovering Structural Regularity in 3D Geometry". Last accessed Jan. 6, 2011, 158 pages.
Felzenszwalb, "Efficient Graph-Based Image Segmentation". Last accessed Jan. 6, 2011, 26 pages.

(Continued)

*Primary Examiner* — Ulka Chauhan
*Assistant Examiner* — Schiller Hill
(74) *Attorney, Agent, or Firm* — Amin, Turocy & Watson, LLP

(57) ABSTRACT

Systems and methods are provided to facilitate architectural modeling. In one aspect, a modeling system is provided. This includes a processor configured to generate remodeled images associated with one or more architectural structures. A procedural model is configured to integrate an approximate model from aerial images of the architectural structures and a three-dimensional (3D) reconstruction model from ground-level images of the architectural structures.

20 Claims, 13 Drawing Sheets

(56) References Cited

OTHER PUBLICATIONS

Xiao, et al., "Image-based Facade Modeling". Last accessed Jan. 6, 2011, 10 pages.
Xiao, et al., "Image-based Street-side City Modeling". Last accessed Jan. 6, 2011, 12 pages.
Wonka, et al., "Instant Architecture". Last accessed Jan. 6, 2011, 9 pages.
Tan, et al., "Single Image Tree Modeling". Last accessed Jan. 6, 2011, 6 pages.
Zebedin, et al., "Towards 3D map generation from digital aerial images". ISPRS Journal of Photogrammetry & Remote Sensing 60 (2006) 413-427. www.sciencedirect.com Last accessed Jan. 6, 2011, 15 pages.
Yanxi Liu, et al., "A Computational Model for Periodic Pattern Perception Based on Frieze and Wallpaper Groups". IEEE transactions on pattern analysis and machine intelligence, vol. 26, No. 3, Mar. 2004. Last accessed Apr. 21, 2011, 18 pages.
Maxime Lhuillier, et al., "A Quasi-Dense Approach to Surface Reconstruction from Uncalibrated Images". IEEE transactions on pattern analysis and machine intelligence, vol. 27, No. 3, Mar. 2005. Last accessed Apr. 21, 2011, 16 pages.
Pollefeys, et al., "Detailed Real-Time Urban 3D Reconstruction From Video". Last accessed Apr. 21, 2011, 44 pages.
Gareth Loy, et al., "Detecting Symmetry and Symmetric Constellations of Features". Last accessed Apr. 21, 2011, 14 pages.
Carsten Rother, et al., "GrabCut—Interactive Foreground Extraction Using Iterated Graph Cuts". Last accessed Apr. 21, 2011, 6 pages.
Pascal Muller, et al., "Image-based Procedural Modeling of Facades". Last accessed Apr. 21, 2011, 6 pages.
Sudipta N. Sinha, et al., "Interactive 3D Architectural Modeling from Unordered Photo Collections". Last accessed Apr. 21, 2011, 10 pages.
Dorin Comaniciu, et al., "Mean Shift: A Robust Approach Toward Feature Space Analysis". Last accessed Apr. 21, 2011, 17 pages.
Yoav I H Parish, et al., "Procedural Modeling of Cities". Last accessed Apr. 21, 2011, 8 pages.
Yael Pritch, et al., "Shift-Map Image Editing". 2009 IEEE 12th International Conference on Computer Vision (ICCV) 978-1-4244-4419-9/09/$25.00 (c)2009 IEEE. Last accessed Apr. 21, 2011, 8 pages.

\* cited by examiner

IMAGE-BASED PROCEDURAL REMODELING OF BUILDINGS

CLAIM OF PRIORITY UNDER 35 U.S.C. §119

This application claims priority to U.S. Provisional Patent Application No. 61/282,351, entitled METHOD FOR IMAGE-BASED PROCEDURAL REMODELING OF BUILDINGS, and filed on Jan. 28, 2010, the entirety of which is incorporated herein by reference.

TECHNICAL FIELD

The subject disclosure relates generally to computer modeling and, more particularly, to applications where multi-dimensional models are applied to images to more accurately visualize architectural structures.

BACKGROUND

Large-scale city modeling has many important applications, where semi-automatic and automatic image-based modeling methods have been developed. Image-based approaches have the inherent advantage of producing photo-realistic textures. However, all these methods suffer from the same weakness. They can only recover the building parts that are visible to a sensor. Invisible regions for a high-rise building by a limited sensor may be inferred from visible regions using prior knowledge. So far, only a few simple prior assumptions such as planarity, smoothness, and rectilinearity have been explored. Resulting models often lack in high level descriptions, which causes the re-usage of these models in content creation applications to be more difficult. Procedural city modeling uses shape grammar rules to generate large scale city models. Applying this to city modeling is interesting, but difficult due to the difficulties of deriving rules for real buildings. In this regard, conventional systems do not allow for the extraction of grammars automatically for buildings or the development of a library of rules, which could be reused in other modeling applications.

It is often not necessary to model a given building "from scratch" as there are existing models available online, for example. The three-dimensional ("3D") platforms of conventional online platforms for visualizing the Earth, for example, have served large amounts of 3D textured models of real buildings for many cities of the world. These models are reconstructed from aerial images at large-scale to provide a suitable landscape of building tops, however the facade geometry and texture of buildings are in poor quality. Efforts have been made to capture the images at ground level to provide a panoramic view at ground, but there is no 3D geometry reconstructed from these images.

Current reconstruction methods include procedural and image-based modeling methods. Procedural modeling roots in the production system, e.g., Chomsky grammars and shape grammars. Geometry interpretation and control of the derivation are specialized to fulfill the requirement of graphics modeling. An L-system is introduced for plant modeling. For architecture modeling, a computer generated architecture (CGA) shape is introduced by combining the set grammars with a split rule, yielding a powerful deviation system for detailed building geometries. Although the design of grammar systems has been studied, there is only limited work on how to extract the grammars from existing models. For instance, one grammar extraction method employs a top-down partition scheme to extract the split rules from a rectified facade image. However, extracted grammar rules are limited to grid-like subdivisions.

Image-based modeling utilizes images as input to reconstruct the 3D geometrical representation of objects. Structure from motion (SFM) and multiple-view stereo are usually the starting point of image-based modeling. After 3D point clouds are reconstructed, a model regularization process is utilized to finally generate a clean 3D mesh model. The fundamental task of image-based modeling is to infer a structural 3D mesh from the unstructured 3D point clouds. And usually, only partial point clouds can be reconstructed. In contrast to using general surface smoothness assumptions, recently, more and more domain-specific knowledge are incorporated into the inference process according to the problem domain. One method used a branch library extracted from visible branches to synthesize a complete tree model. Another method used a developable surface to approximate dominant facade surface, and used more restricted rectilinear assumptions.

The above-described deficiencies of today's 3D modeling are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects disclosed herein. This summary is not an extensive overview. It is intended to neither identify key or critical elements nor delineate the scope of the aspects disclosed. Its sole purpose is to present some concepts in a simplified form as a prelude to the more detailed description that is presented later.

Systems and methods are provided to enhance performance of image-based models. In one aspect, a modeling system is provided. The system includes a processor configured to generate remodeled images associated with one or more architectural structures. A procedural model is configured to integrate an approximate model from aerial images of the one or more architectural structures and a three-dimensional (3D) reconstruction model from ground-level images of the one or more architectural structures. In another aspect, a method is provided that includes receiving one or more satellite images of building structures and one or more ground-level images associated with the building structures. The method includes registering three-dimensional models and three-dimensional structure from at least one motion sequence from the satellite images and the ground-level images. This includes decomposing the three-dimensional models and the three-dimensional structure from the at least one motion sequence into building components. The method also includes generating rules from the building components to facilitate remodeled imaging of the building structures.

In yet another aspect, a tangible computer-readable medium is provided. This includes instructions for causing a computer to process models derived from aerial and ground-level images of building structures. The computer-readable medium also includes instructions for causing the computer to register the models in accordance with one or more motion sequences associated with the aerial and ground-level images. This includes instructions for causing the computer to generate one or more mesh rules and one or more texture rules describing the building structures, wherein the mesh rules include building roof regions and façade planes, and the texture rules are employed to detect repetitive elements in a façade. The computer-readable medium can also include instructions for causing the computer to generate one or more remodeled images of the building structures based in part on the one or more mesh rules and the one or more texture rules.

To the accomplishment of the foregoing and related ends, the subject disclosure then, comprises the features hereinafter fully described. The following description and the annexed drawings set forth in detail certain illustrative aspects. However, these aspects are indicative of but a few of the various ways in which the principles disclosed herein may be employed. Other aspects, advantages and novel features will become apparent from the following detailed description when considered in conjunction with the drawings.

DETAILED DESCRIPTION

Systems and methods are provided to facilitate architectural modeling. In one aspect, a modeling system is provided. This includes a processor configured to generate remodeled images associated with one or more architectural structures. A procedural model is configured to integrate an approximate model from aerial images of the architectural structures and a three-dimensional (3D) reconstruction model from ground-level images of the architectural structures.

As used in this application, the terms "component," "system," "model," "rule," "mesh," "synthesis," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Figure 1:
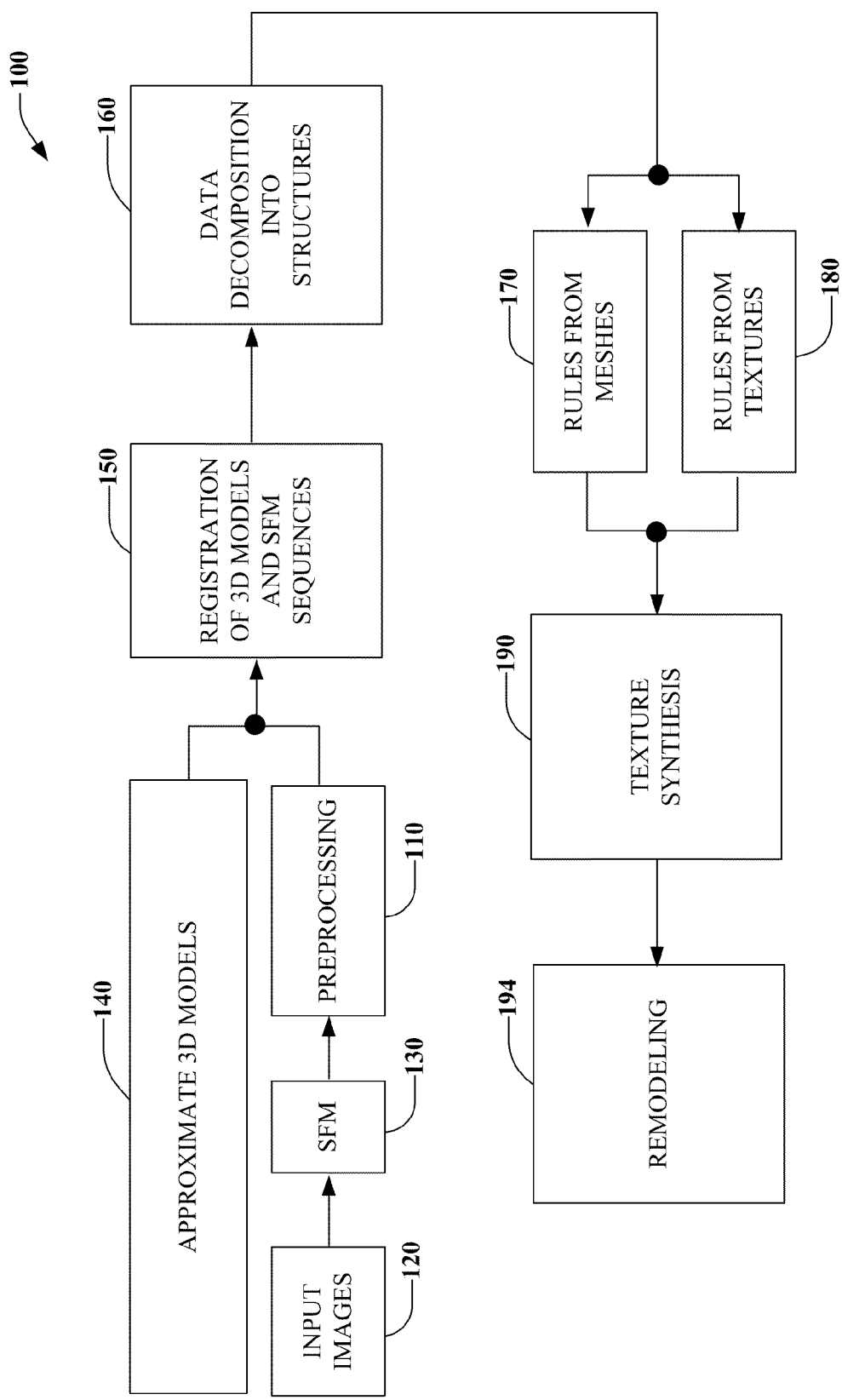
FIG. 1 a schematic block diagram of an image-based procedural remodeling system.

Referring initially to FIG. 1, an image-based procedural remodeling system 100 is illustrated. The system 100 includes a preprocessing stage 110 that receives input images 120 and structure from motion (SFM) data 130. Approximate 3D models 140 are also analyzed in parallel to the preprocessing stage 110. Although not shown, the system 100 can include processors and other computer components for executing the various system components including tangible computer-readable medium to store instructions for the respective execution of the components. Output from the preprocessing stage 110 and 3D models 140 is fed to a registration component 150 which is described in more detail below. Output from the registration component 150 is processed by a decomposition component 160 which generates rules from meshes and rules from textures 180. Output from the rules 170 and 180 is generated as texture synthesis 190 which produces a remodeled image of architectural structures at 194. Such structures can include buildings or substantially any shape that can be modeled from acquired images such as from ground-level images and aerial images.

Image-based procedural modeling is employed by the system 100 to remodel structures such as buildings, for example, by utilizing existing approximate models of structures and input images captured at ground level. A three-dimensional (3D) model is first registered with a 3D reconstruction of input images, whereby data is semantically decomposed into individual buildings or other structures for remodeling. Buildings or other structures can be represented by shape grammar rules, which can be learned from the respective model and images. Architecture structure of each building facade can be analyzed utilizing repetitive and non-repetitive architecture elements that are detected and re-assembled into grammar rules. A novel detection method of repetitive patterns in orthographic texture image enables the facade analysis to be more robust and efficient than previous modeling methods. The buildings or other structures are remodeled by synthesizing textures from input images based on extracted grammar rules. Such methods are automated and have been employed for modeling of various scenarios and city-scale examples.

Figure 2:
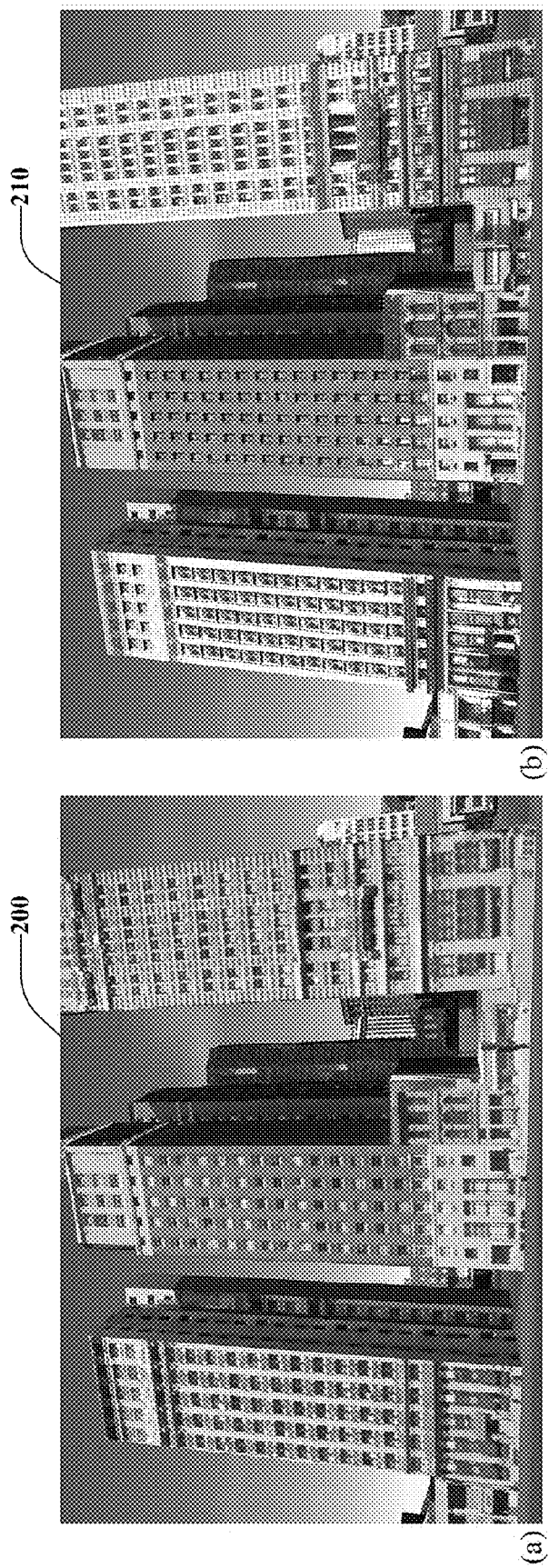
FIGS. 2-4 illustrate example modeling aspects and images that can be processed according to the system depicted in FIG. 1.
Figure 3:
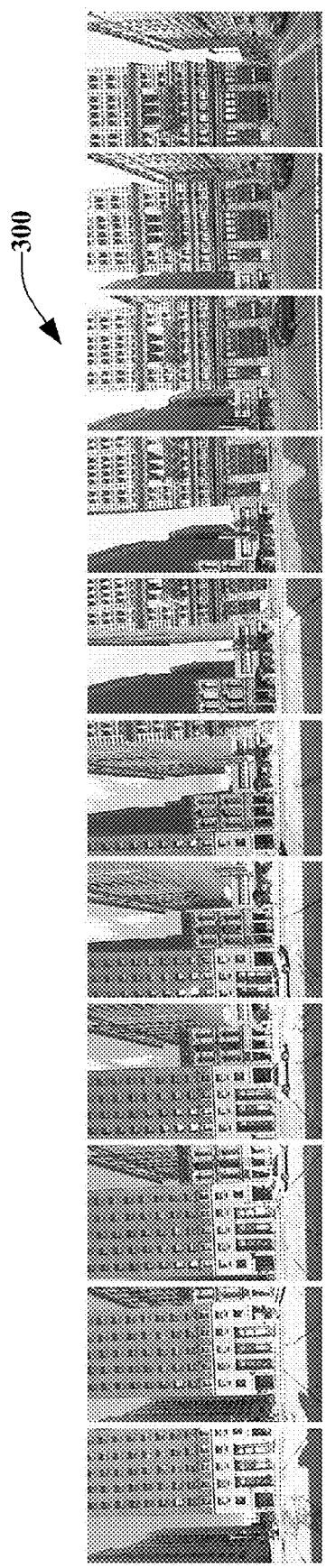
Figure 4:
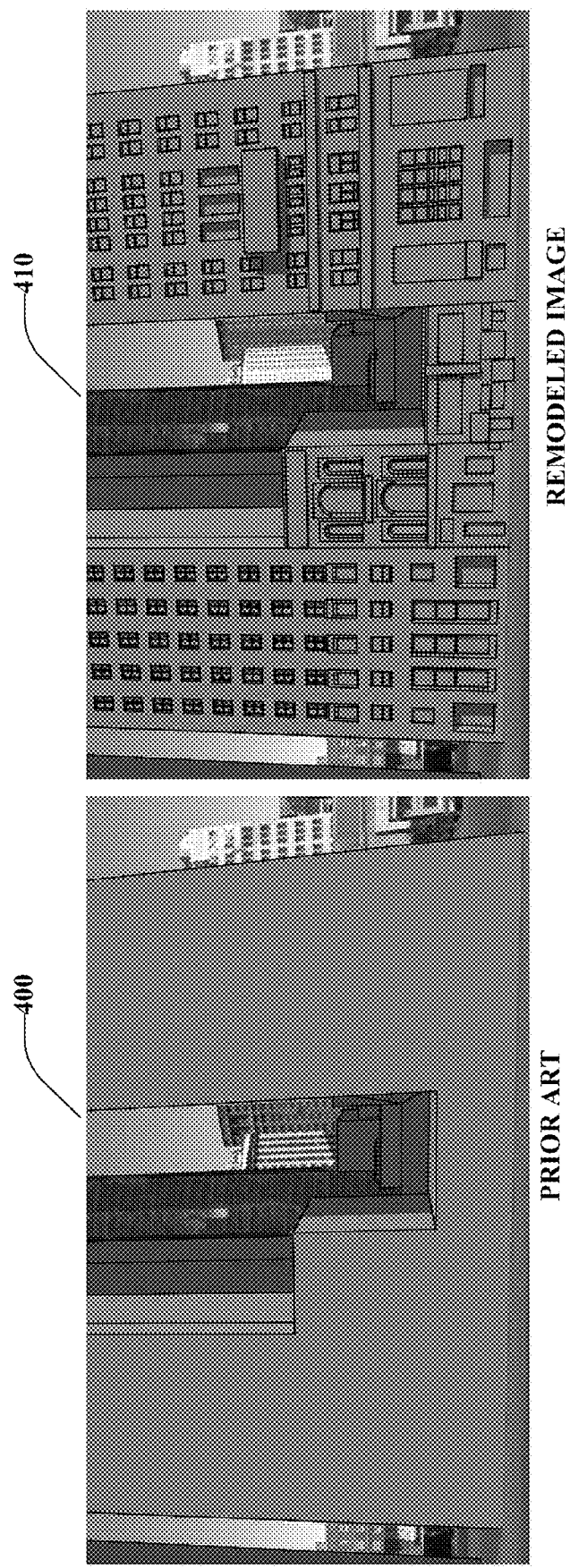

Before proceeding it is noted that the system 100 will be described in conjunction with various drawings that follow where the drawings illustrate one or more example aspects to the image-generating capabilities of the system. From time-to-time during the discussion, subsequent drawings will be discussed in context of the general system drawing shown in FIG. 1. For instance, a prior art image shown at 200 of FIG. 2 which is compared to an example remodeled image 210 generated via the system 100. FIG. 3 illustrates a sample of input images 300 which are related to captured images 120 from FIG. 1, whereas FIG. 4 illustrates comparable geometries between a prior art model 400 and a remodeled image 410 according to the components and methods depicted in the system 100 of FIG. 1.

Referring back to FIG. 1, one aspect to the system 100 is to combine at least two sources of information—available approximate 3D meshes 140 and ground-level input images 120 to generate a sufficient model in geometry and texture for buildings or other structures. To achieve this, at least three aspects are considered including, (1) what are the desired grammars to describe buildings? (2) how to automatically extract grammars from data? and (3) how to use learned grammar to refine the models.

The input to the system 100 is an existing 3D textured mesh 140, often at low resolution from aerial images, and 2D images captured at ground level at 120. First, the 3D mesh and the 3D reconstruction of input images are registered by using 3D line features. Then, the mesh and the reconstructed sequence are decomposed into individual buildings for remodeling at 160. Computer Generated Architecture (CGA) shape grammar are employed to represent buildings or other desired structures/shapes to model. A contain rule is introduced to replace the split rule employed previously. After rules processing, grammar rule extraction from the input data is generated. Rules can be learned from the 3D mesh by decomposition at 160. Rules can then be learned from the orthographic texture image of a façade for example, in which the system 100 detects repetitive and non-repetitive elements. A robust voting method has been developed that efficiently detects repetitive patterns available in the texture image. The structural information of a building is encoded by grammar rules learned from at least three sources: the 3D mesh model, an orthographic texture image from input images, and the original texture map of the mesh. Finally, the building is remodeled at 194 by synthesizing new textures from the input images 120 and 140 with the grammar rules.

One approach is the convergence of procedural methods and image-based methods. A procedural remodeling approach is provided that integrates an existing approximate model from aerial images and a 3D reconstruction from ground-level images. The CGA shape grammar rules are improved for buildings by introducing contain rules that overcome the weakness of previous split rules for buildings. A grammar rule extraction method is provided operating on a geometry mesh and on facade texture images. Robust and efficient detection of repetitive patterns in facade texture image are provided which results in a superior facade structure analysis method. A texture synthesis method is provided that can be based on the grammar rules for the completion of remodeling.

The following discussion provides a more detailed description of each of the components depicted in the system 100 of FIG. 1. Input images 120 are captured by a camera moving along streets and facing the building facades. Google street view images and Microsoft Streetside images are typical examples. Approximate 3D models of buildings at 140 of the system 100 are usually reconstructed from aerial images at a large-scale. The building models served by Google Earth and Microsoft Virtual Earth are typical examples. These models are very good, when viewed at large-scale, but disappointing when viewers arrive at the ground level.

Structure from motion 130 is employed to reconstruct 3D point clouds and camera pose concurrently, where a semi-dense structure from motion (SFM) is used. One advantage of the semi-dense approach is that it provides a sufficient density of points that are globally and optimally triangulated in a bundle-like approach. The GPS/INS data is in turn used to initialize the Euclidean bundle adjustment and to register the reconstructed point cloud back to the GPS/INS coordinate system with a rigid transform.

Semantic segmentation is employed to recognize and to segment each image at pixel level into semantically meaningful areas, such as building, sky, ground, vegetation and car, since such segmentations are proven to be useful on removing occluders (e.g., features blurred or blocked from view) and regularizes texture and model boundaries. The multi-view semantic segmentation is used as it accounts for the textural image information and the reconstructed 3D points. The segmentation results are used in filtering 3D points and lines, and in defining occlusion masks for synthesis.

Line segments are extracted from images and reconstructed in 3D. Two groups of the line segments are identified: vertical line segments and horizontal segments by vanishing points. As the camera is moving laterally at ground, it can be difficult to reconstruct the horizontal lines in 3D space due to lack of horizontal parallax.

At 150 of the system 100 in FIG. 1, mode-based registration occurs. The registration of the reconstructed sequences is started with 3D mesh models, which is assumed to be a similarity transformation. According to GPS data associated with both the mesh models and the reconstructed sequences, an initial estimate of the similarity transformation is straightforward, but the estimate can be refined both globally and locally. For a reconstructed sequence associated with global registration, first identify a corresponding mesh by using the distance of the middle camera to the mesh. If a large mesh has several corresponding sequences, merge these sequences into a large sequence to provide a one-one correspondence between a mesh and a sequence.

Then, use vertical lines as the features to further refine the similarity transformation between the corresponding sequence and mesh. The vertical lines extracted from a mesh form a set Lm, and the reconstructed 3D vertical lines in form a set Lt. Proceed to search for the closest pair of lines (lt, lm) as the matching lines. From the matching lines, obtain a pair of matching points by determining the intersection point of the vertical line with the ground plane. The ground plane is the horizontal dominant plane fit to the semi-dense points with GPS information. The similarity transformation is then estimated in a RANSAC manner, and optimized using Levenberg-Marquardt method from the final match inliers with the following objective function:

$$E = \sum_{\forall (p_t, p_m)} \|S[R \mid t]p_t - p_m\| + \sum_{\forall (l_t, l_m)} \|[R]D(l_t) \cdot D(l_m)\|.$$

where D(•) is the unit direction vector of a line.

For building decomposition, a mesh is a singly connected component and may contain several building models. After global registration, each mesh is decomposed into meshes of individual buildings by the vertical lines of the original mesh at 160 of FIG. 1. Accordingly, a reconstructed sequence is also decomposed into subsequences, where each corresponds to a mesh of a single building.

Figure 5:
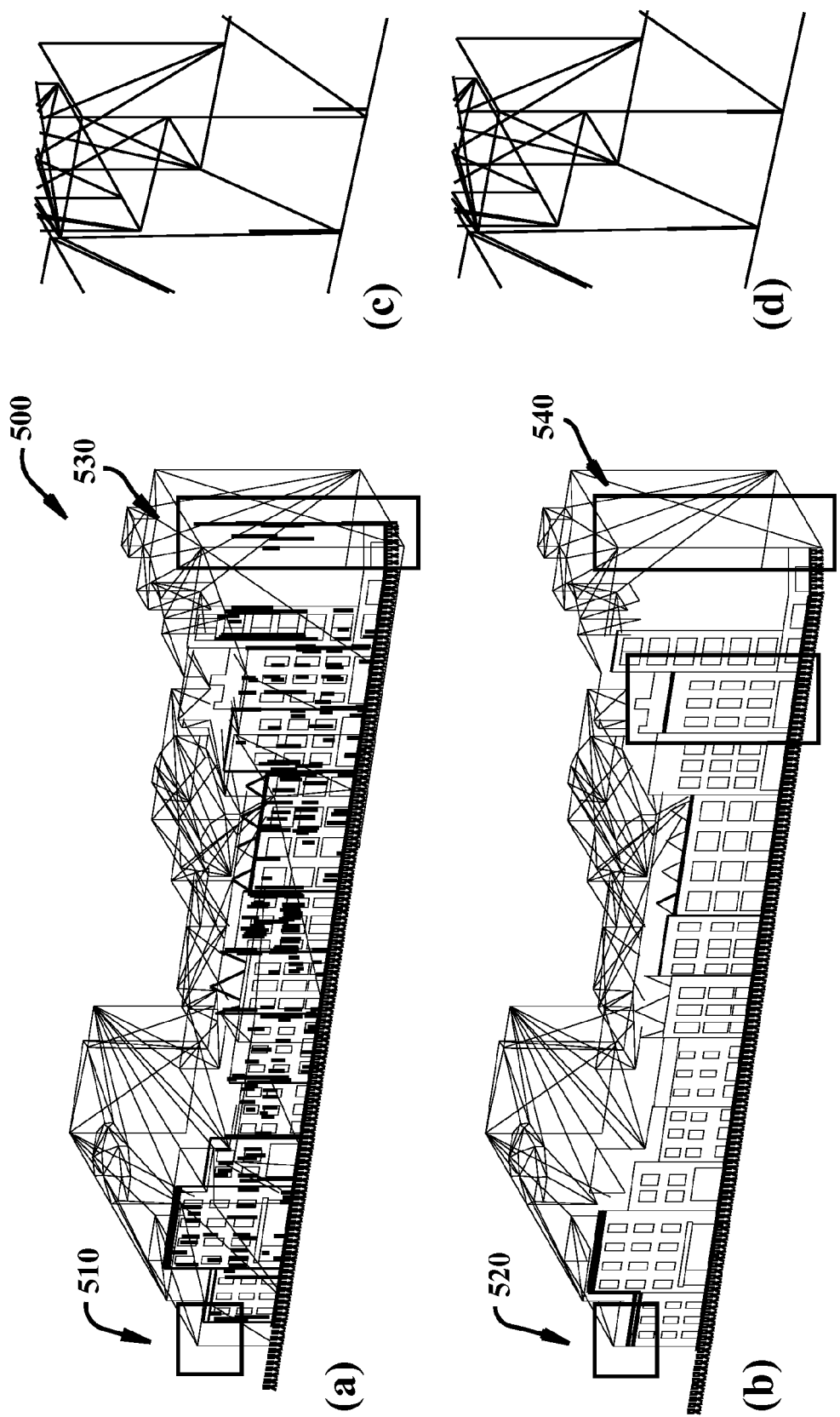
FIG. 5 is a diagram illustrating 3D registration and reconstruction of images.

A similarity transformation is re-optimized locally for the decomposed mesh and the subsequence. A local coordinate frame is aligned with the true vertical line and the horizontal line of the front facade of the building. In the end, an orthographic texture image at 194 of the system 100 is generated for the front facade of the building from all visible input images using an inverse composition method, and one example 500 in FIG. 5 illustrates the alignment results of global and local registration. At 510, of FIG. 5, initial registration by GPS occurs. At 520, Global registration occurs. At 530, a close-up of the global registration is illustrated. At 540, local registration improvement is shown.

Referring back to the system 100 in FIG. 1, a CGA shape grammar is employed to represent buildings. Contain rules can be employed to replace previous split rules. A grammar is denoted as G=(S,Ri), where S is the set of symbols and R is a set of production rules. A symbol s in S is either in the set of terminal symbol V or in the set of non-terminal symbol E, where V∩E=ϕ and V∪E=S. In procedural modeling, symbols can be parameterized and denoted as s(•), where • is a list of parameters, where each symbol, terminal or non-terminal, is a geometry shape with geometric and numeric attributes. A rule r in R specifies how a non-terminal symbol is replaced by a string of terminal and/or non-terminal symbols. There are many grammar systems for procedural modeling. In one example, employ CGA shape as a basic grammar system. In this manner, a production rule can be written as:

id: predecessor⇝ cond: successor: prob where id is a unique identifier for the rule, predecessor ∈E is a symbol identifying a shape that is to be replaced with successor, and cond is a flag to indicate that the rule is selected with probability prob and applied if it is true.

To generate a building with a grammar, a production process is carried out as follows. Given a string str consisting of the symbols in S, an active shape P is selected from str and a production rule L with P on the left hand side is also selected. Then the string Q on the right hand side of L substitutes P as the successor. At the same time, Q is left active and P inactive. This process runs recursively until the string str contains no more non-terminals. Depending on the algorithm for the selection of P, the derivation tree can be explored either depth-first or breadth-first. Nevertheless, a priority is assigned to each rule to induce more controls on the production process, so when selecting the shape to be replaced, select the shape with the rule of highest priority. Please note, in CGA shape, the shapes that are replaced are not deleted, but rather marked as inactive. This enables systems to query the shape hierarchy, instead of merely the active configuration.

A subdivision method defined by split grammar rules is used to augment geometry details. The split rules subdivide a scope from ascending shapes into smaller scopes, which introduce more and more details. However, split rules often over-partition a facade, where a number of splitting is required to generate one rectangle in a facade or a window tile. Moreover, the generated geometry may not be unique. More complex analysis may be needed to consolidate the inconsistent splitting grammars extracted from images. There is generally no mechanism for interactions between sibling symbols generated by split rules. To overcome these disadvantages, a set of rules is introduced based on the concept of 'contain' instead of 'splitting', as it is more natural to suggest that this facade contains four windows rather than 'this facade splits into four regions'. The contain rule has several advantages. First, the positions and regions of descending shapes are explicitly defined. Hence, no splitting is required to gradually subdivide the ascending shapes. Second, users can define properties that are shared by all descending shapes. Third, they are able to be extracted easily from an automated bottom-up and top-down analysis.

The general form of contain rules does not generally have constraints on how many ascending shapes there are and how descending shapes are placed. Formally, the definition is:

$$s \rightsquigarrow \text{Contain}(\text{Num}, r_0, \ldots, r_{Num-1})\{c_0, \ldots, c_{Num-1}\}$$

where Num is the number of components in s, $c_x$ a shape symbol in S and $r_x$ is the placement configuration of the component $c_x$.

The $r_x$ is further defined as $$r_x = (\text{dim}, \text{bound}_x, vis_x, op_x)$$

where $\text{bound}_x$ is the bounding box of the region $r_x$ in dim-dimension space. To better define the relationship between sibling nodes $c_x$, define the priority for the visibility of $c_x$ as an integer $vis_x$, where larger integer implies higher priority for visibility. In addition, $op_x$ is introduced to define the interaction between node $c_x$ with other sibling nodes $\{c_i | vis_i < vis_x\}$, e.g., overlaying and 3D Boolean operations.

Repetitive patterns are common in architecture, thus, specialize general contain rules to generate repetitive components. The repetitive contain rule can be formalized as:

$$s \rightsquigarrow \text{Repeat}(\text{DIR}, \text{step}, \text{times}, r_x)\{c_x\}$$

where DIR can be "X", "Y", "Z", "XY", "XZ", "Y Z", or "XY Z" to specify the direction of the repetitive pattern, step is a vector for steps in different directions, times is a vector for numbers of repetition in each direction, $r_x$ is the initial region, and $c_x$ is the repetitive shape.

Figure 6:
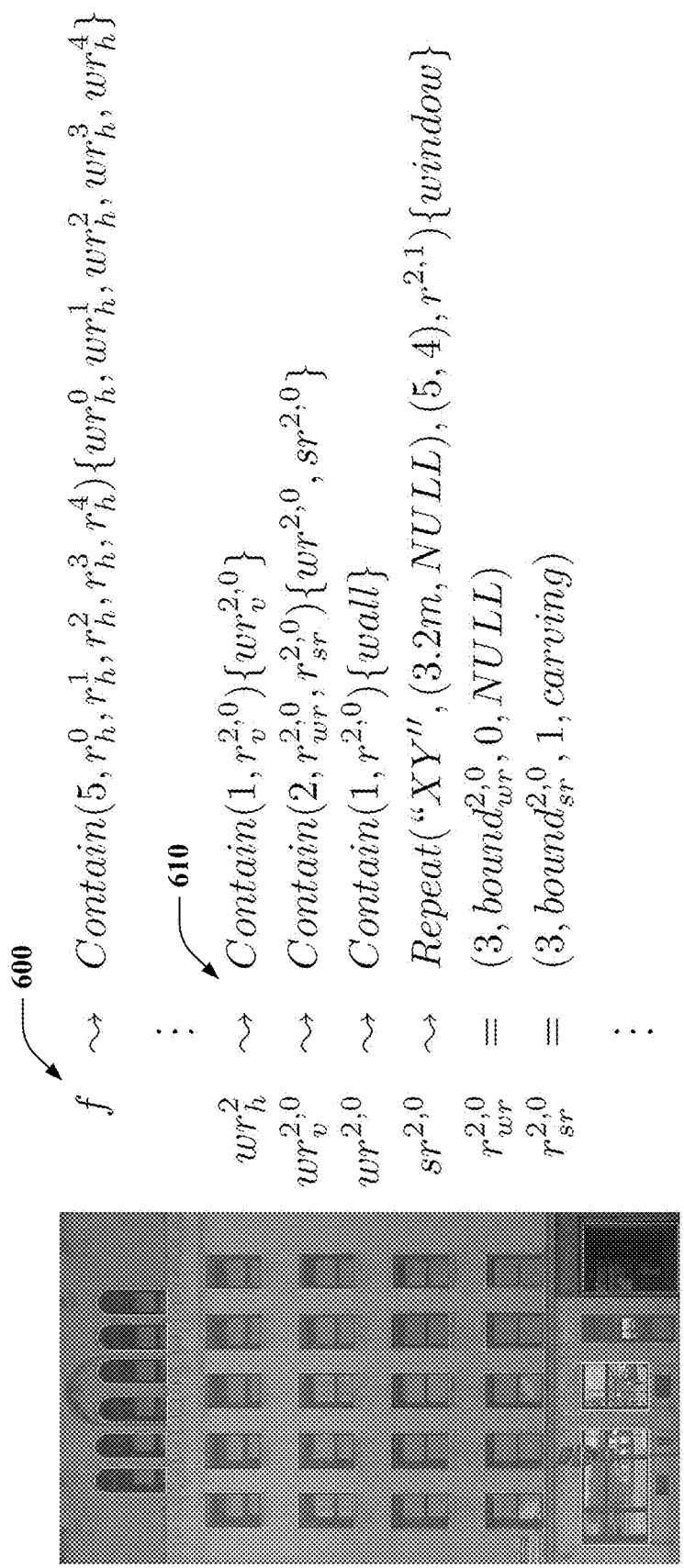
FIG. 6 illustrates example contain rules for a facade description.

An example of contain rules for a faced description is illustrated in FIG. 6. A rule f contain rule at 600 decomposes the facade into 5 horizontal wall regions. The rule $wr^2_h$ at 610 defines the composition of the 3rd wall region from the bottom. It contains only a child $wr^{2,0}_v$, which contains $wr^{2,0}$ and $sr^{2,0}$. The $wr^{2,0}$ represents the wall region and $sr^{2,0}$ represents the repetitive windows. Note that the repetitive pattern $sr^{2,0}$ has a higher visibility priority and will carve the wall $wr^{2,0}$ in the definition of $r^{2,0}_{wr}$ and $r^{2,0}_{sr}$.

Rules from meshes 170 and rules from textures 180 of FIG. 1 are now described in more detail. In one aspect, first extract grammar rules from the 3D models by mesh decomposition. Semantic segmentation of 3D mesh is one of the most challenging problems in mesh processing. In one case, the problem can be simplified by decomposing the building mesh M into roof region Roof and the facade planes F. This simplification makes the problem solvable as well as satisfiable with the requirement of the following grammar extraction. First delete the shared edges between two coplanar planes. Then, extract major vertical planes at ground as the facade planes and the remaining mesh above the vertical planes as the roof planes R.

Extract the 3D grammar in the following form:

$$s \rightarrow \text{Contain}(|F|+1, r_0, \ldots, r_{|F|-1}, r_{roof})\{f_0, f_0, \ldots, f_{|F|-1}, \text{Roof}\}$$

where $f_1 \in \mathcal{F}$.

In another aspect, discover the repetitive and non-repetitive structure elements and analyze the facade structure to extract corresponding grammar rules. There have been many methods for regularity or symmetry analysis. They are basically Hough transform like methods, varying in the manner of how to sample data space and where to vote. In one example, a framework to discover structural regularity in 3D geometry using discrete groups of transformations can be employed. Thus, a method that detects translational repetitiveness in an orthographic texture image of a façade can be provided. Because of the restricted translational structures and the richness of texture information for similarity computation, such method turns out to be both efficient and robust.

In general, first detect Harris corners in the texture image, and use these corner points as sampling points of the entire facade texture. Harris corners are suitable for sampling because of stability in detection. For each sampling point, compute a similarity map using the sum of squared difference (SSD) between a patch of width w centered at the corner point and each pixel in the texture. Using a mean-shift method, locate stationary points of the similarity map from the modes of this density map. These stationary points are the potential similar points of the sampling point. Set w to 30 pixels for example. Take all pairs of the stationary points and the sampling point, and for each pair, compute a translation and map it onto a 2D plane, which is the transformation space of 2D translations. This 2D transformation space is represented by a 2D array as the accumulator to receive the computed translations from all pairs. A mean-shift is used to compute the mode points, which are used to fit a rectangular grid called a lattice through the origin of the transformation space. The stationary points whose translations with the sampling point are on the fitted lattice are retained as the set of similar points, to which also adds the sampling point.

Figure 7:
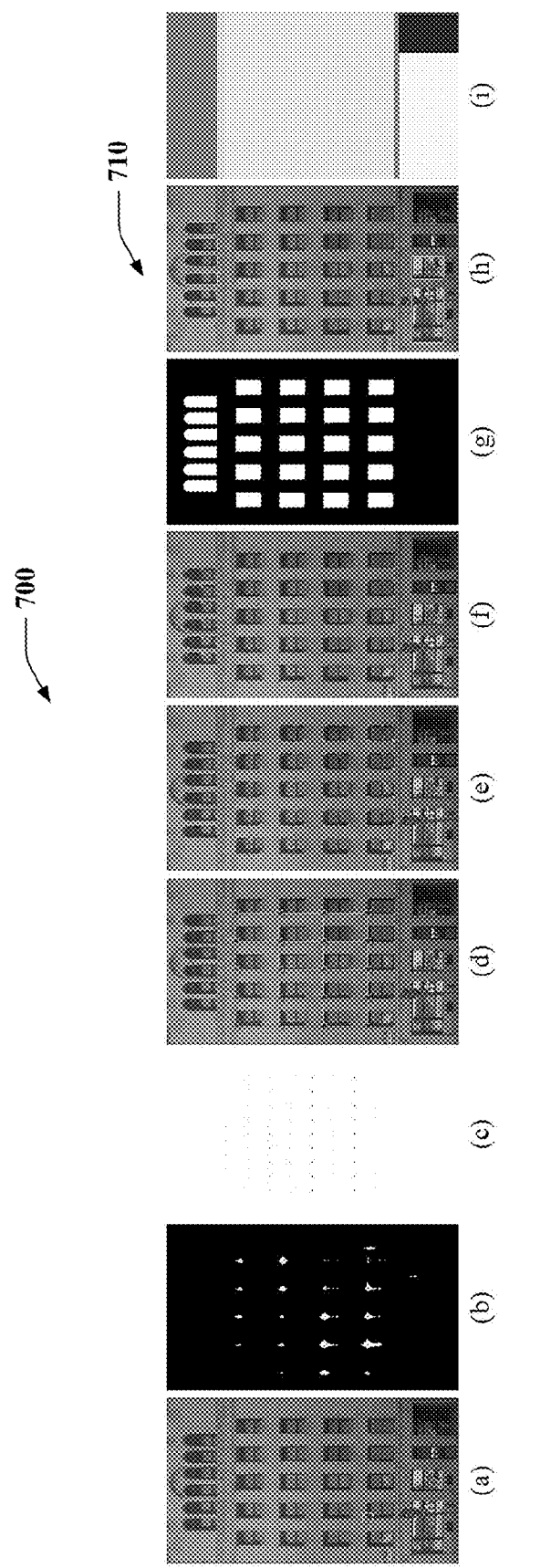
FIG. 7 illustrates example sampling points for a facade description.
Figure 8:
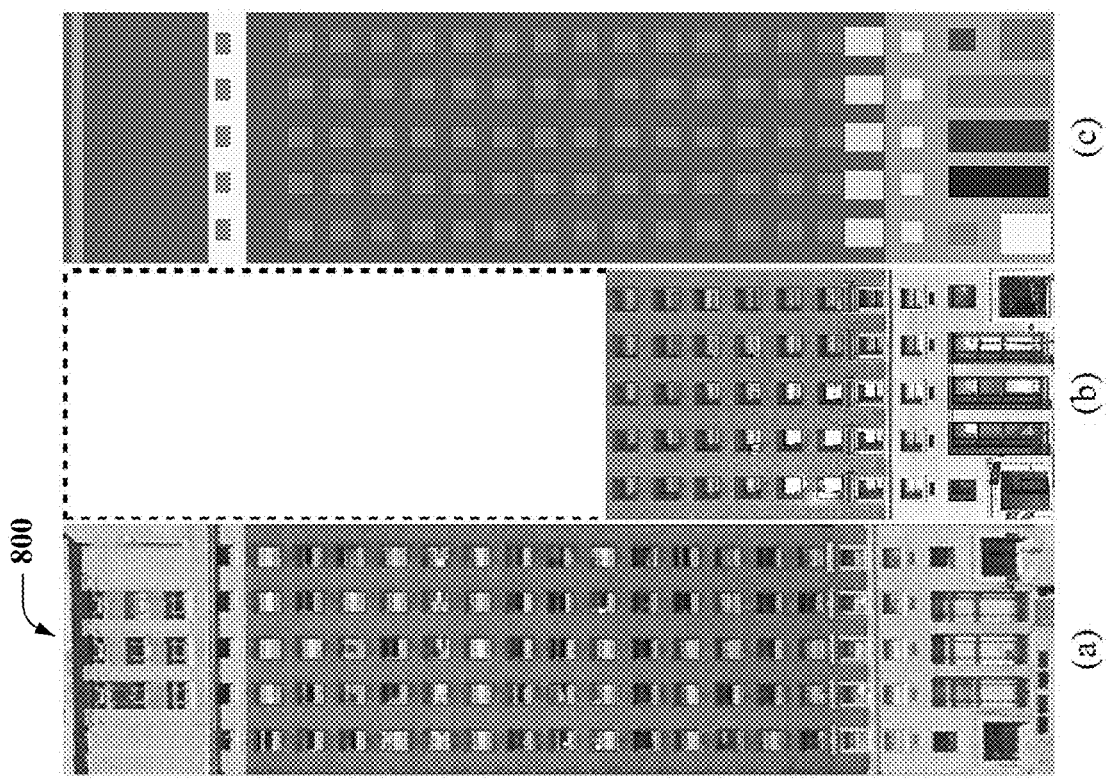
FIG. 8 illustrates example rule extraction from an original texture of a 3D model and façade texture at ground level.

Compute the bounding box of the similar points, and construct a grid in the image space. Note that the term grid is employed in image space and a lattice in transformation space. If 90% of the similar points are on the constructed grid, the grid is confirmed for the given sampling point. Each sampling point thus yields a potential grid in image space through a lattice in transformation space, perform the same for all sampling points, and then obtain many confirmed grids. The grids are grouped together if they are overlapping. Then, the overlapping grids of the group are clustered by the type of grids, for instance, a 3×1 grid is different from a 1×3 grid. Retain at the top five ranked types of grids, for example. Each type of grid defines a repetitive pattern. All similar points from different grids but belonging to the same grid position are grouped together, and its centroid is computed. A tile centered at the centroid with asimilar size as the cell of the lattice in transformation space is constructed. Such a rectangular tile is expected to contain one individual element of the repetitive pattern. Utilize GrabCut within the tile to segment foreground out of the background wall as the architecture element. The median of all the foreground segment of the same type is taken as the representative shape of the architecture element. One example is shown in FIG. 7 with a recomposed orthographic texture image 700, and another example is shown in FIG. 8 at 800 with a low resolution facade texture from aerial view.

In addition to the repetitive patterns of a facade, there are also non-repetitive structure elements. One method uses both the registered images and the reconstructed semi-dense points to reconstruct salient regions as the potential structure elements. It essentially operates in the orthographic facade plane to collect both texture and depth information patch by patch, similar to a depth map fusion technique. The method results in a set of reconstructed rectangularly-shaped elements with depth, which is illustrated at of 710 FIG. 7.

The boundaries of the detected repetitive elements are noised arbitrary contours. The reconstructed non-repetitive elements are forced to be rectangle for robustness. In one aspect, match these recovered elements against a set of predefined generic templates. Set up a template database T, in which each template $t \in T$ has a Type, windows or doors for instances, and a shape st, parametrized by its bounding box. Select the potential matching by the bounding boxes of the element and the template. Then compute a score:

$$score = \frac{D(s_t, r_{sa})}{B(s_t)}$$

for $S_t$ and $r_{sa}$, where $D(s_t, r_{sa}) = s_t \cup r_{sa} - s_t \cap r_{sa}$ as the difference of the binary mask of st and rsa and B(st) is the length of the boundary of st measured in pixels. The match is established for the pair having the highest score. The position of the template t is refined by searching exhaustively around a small neighbor to snap it to the positions where the edge response is the strongest. Moreover, a set of 3D models is associated with each template t for remodeling purpose, thus search for the most similar 3D model.

A set of architecture structure elements including repetitive and non-repetitive elements is defined. The other regions on the facade texture are regarded as wall region WR. The structure elements are first merged into structure regions. Each group of repetitive pattern forms a repetitive structure region. If multiple repetitive regions are overlapped, merge them as one. If a structure element is overlapped with a repetitive region, merge them and use the bounding box of them as the new repetitive region. After the merging of repetitive regions, the remaining structure elements are merged according to their background wall and position by using a bottom-up merging segmentation method. Now, obtain a set of structure regions SR.

Further partition the wall region into regions each of which contains a structure region sr∈SR, and build a hierarchical relationship of structure regions. First, project and accumulate the gradients of X and Y direction of the wall regions on the horizontal and vertical axis. The accumulated values are normalized with the number of pixels along the direction of accumulation. Then the partition process starts by dividing the wall region WR vertically into a set of horizontal wall regions WRh. If there is a local maximum response in the vertical direction that does not intersect structure region, the wall is partitioned at this line. Finally, each horizontal wall region wrih∈WRh is further partitioned horizontally into a set of vertical regions WRiv.

At this stage, the facade texture is decomposed into a few horizontal wall regions each of which contains a few vertical wall regions. Again each vertical wall region generally contains a structure region. The literal description above shows that the decomposition of a facade f can be naturally represented with the following set of contain rules:

$$f \rightsquigarrow \text{Contain}(|WR_h|, r_h^0, \ldots r_h^{|WR_h|-1})\{wr_h^0, \ldots wr_h^{|WR_h|-1}\}$$

Then, for each $wr_h^1$, we have $$wr_h^t \rightsquigarrow \text{Contain}(|WR_v^t|, r_v^0, \ldots r_v^{|WR_v^t|-1})\{wr_v^{t,0}, \ldots wr_v^{t,|WR_v^t|-1}\}$$

A large number of rules generally are extracted in a hierarchical manner, so the rules at different level are generally not interchangeable with each other. Hence, a grammar is organized in three levels. The first level organizes the learned 3D rules. The second level organizes the layout of background wall regions. The third level contains the rules that structure each region. Extract one 3D rule from each building, so the 3D grammar stored in the set _3D collects all the 3D rules identified by an ID for each rule. Extract also one rule for the layout of the wall regions of each facade. Similarly, sum up these rules and store them in the rule set _WR. The rules inside each facade are stored in _SR. Finally, the basic elements are organized and stored according to their template class.

The minimum requirement for this approach is an existing approximate mesh model of buildings and input images of buildings at ground level, so to have at least one rule for each of the three levels of the building grammar. In practice, the existing 3D model includes a texture. Though the texture often obtained from aerial images is at low resolution, one can still apply the same rule extraction method developed in the previous section to the texture image to obtain additional structural information of the building. FIG. 8 at 800 illustrates one such example. The rules extracted from two different sources are to be merged. The facade layout is merged and for the two overlapping regions having structures detected from two sources—employ the rules from the ground level images, then from the aerial images.

Existing image-based methods suffer from missing of textures due to the foreground occlusion and the limited view angle of cameras. Previous methods required users to specify the structural information to synthesize, where the learned grammar rules are employed to guide an automatic synthesis. Intuitively, one would like to generate textures differently for three types of regions with respect to ground level images.

Figure 9:
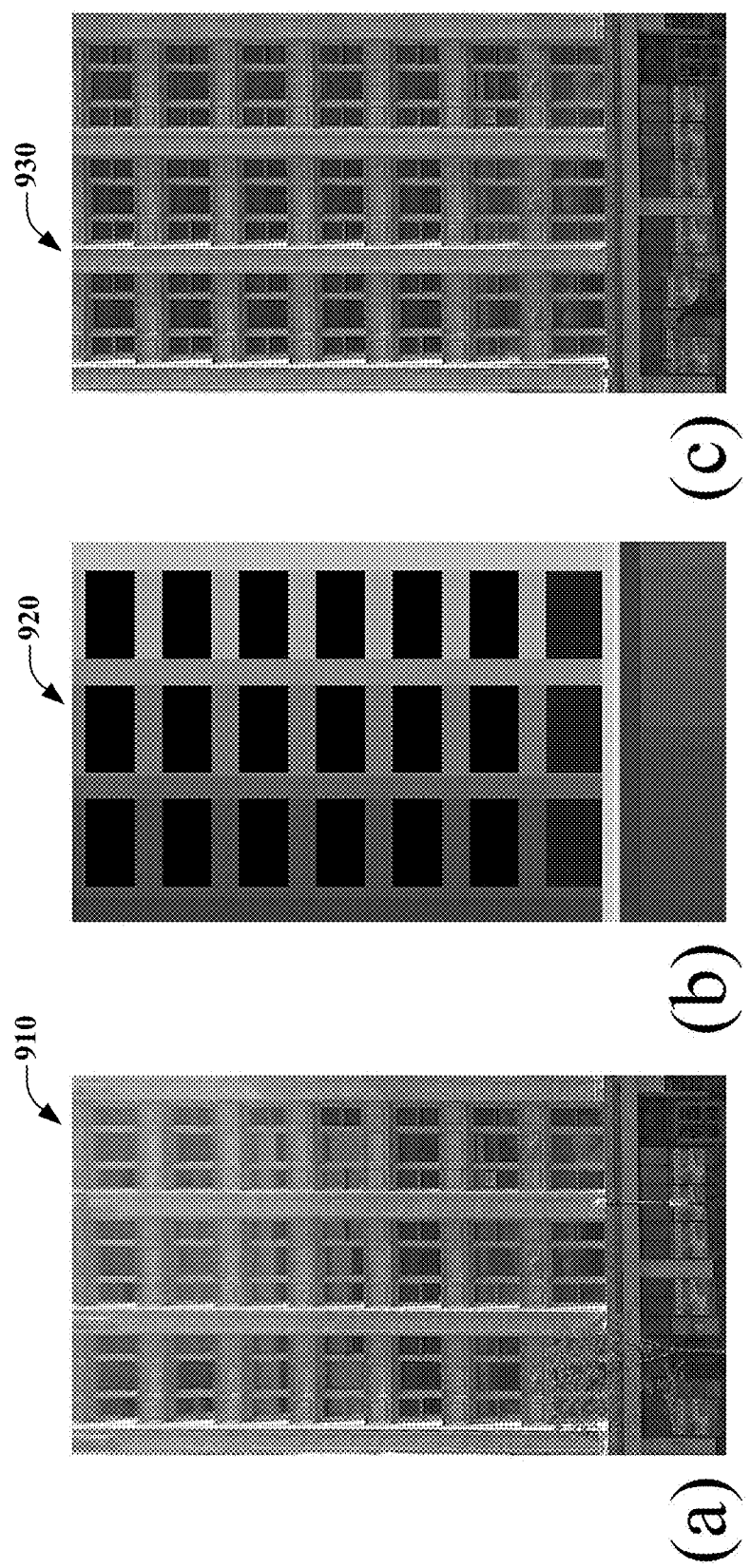
FIG. 9 illustrates example texture improvements from occluded textures to synthesized textures.

Visible regions are covered by any of the visible input images. The texture should be kept as is from the orthographic texture image. The occluded regions are retrieved from the semantic segmentation results as the union of the occluding masks of the foreground objects from all visible input images. The invisible regions are not covered by any input image at ground level. If such a region is in a structure region, the missing texture is re-synthesized by completing the structure. If it is not in a structure region, the missing texture is re-synthesized from the wall texture. One texture synthesis method is based on a shift-map image editing method. Thus, convert grammar rules into a structural map in the original shift map formulation. The structural map C stores an integer label for a grammar symbol at each pixel. The goal is to synthesize the region R from a set of source images $\{S_i\}$, with the structural maps CR and Ci, where i indexes the input images. Now for each pixel p: $(x, y) \in R$, it is expected to find a pixel si: $(x', y') \in S_i$ with a mapping $M(x, y)=(i, tx, ty)$, where and $(tx, ty)=(x', y')-(x, y)$ such that it minimizes the following objective function:

$$E(M) = \sum_{p \in R} E_d(M(p)) + \alpha \sum_{q \in N(p)} E_s(M(p), M(q))$$

where Ed is the data term to penalize inconsistent labeling between the synthesized pixel p and the source pixel M(p), and Es is the smoothness term to penalize the inconsistency between the source patch around M(p) and the source patches M(q) of the neighboring pixels $a \in N(p)$. In one example implementation, $E_d(\cdot)=\infty$ if $C(p) \neq C(M(p))$, and $E_d(\cdot)=0$ otherwise. $E_s(\cdot)$ is set to be the normalized SSD of the overlapped region of two patches centered at M(p) and M(q). The $\alpha$ is a weight balancing the two terms and is set to 1 in one implementation. The optimal label configuration can be obtained by hierarchical multi-label graph cuts. FIG. 9 shows a blurry texture example at 910, a structure mask at 920, and synthesized texture at 930.

Figure 10:
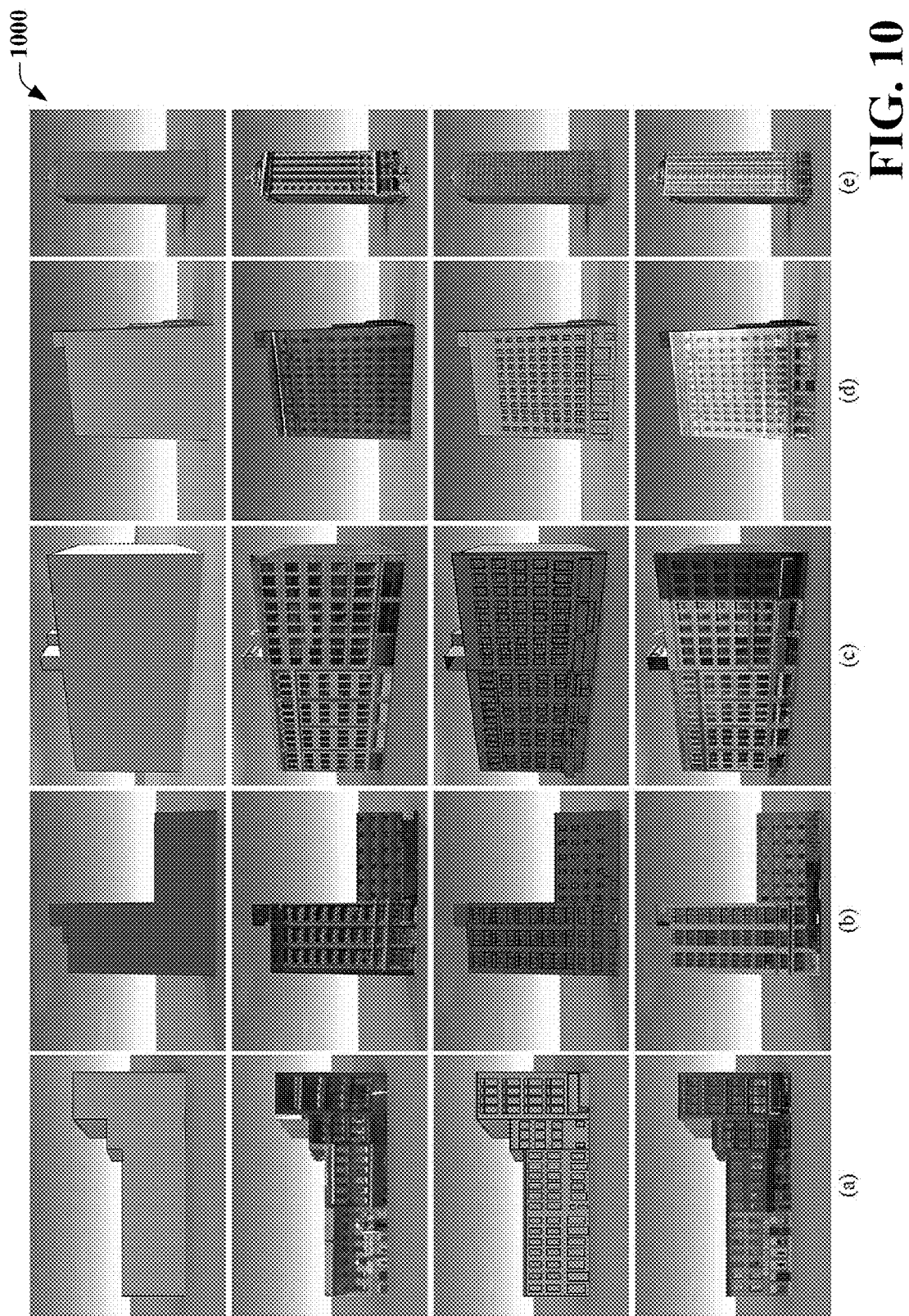
FIG. 10 illustrates examples of remodeled images from existing models.

The above described systems and methods were tested on a typical example of the city of Pittsburgh for which both the 3D models served by Google Earth and the input images systematically captured at ground level exist. Street-view images originally captured are panoramic. To run the semi-dense structure from motion, re-project these panoramic images into normal projective images at 800×1380 resolution. Use the panoramic images for texture mapping for a wider coverage. Also, break the data set into sequences of 100 frames to run the structure from motion (SFM), which are then geo-registered back to the GPS coordinate frame of the 3D models. On a standard desktop PC, each sequence takes about 15 minutes for structure from motion, 10 minutes for semantic segmentation and 10 minutes for registration. For each building, a typical size of orthographic texture image is 1000×1000. The detection of repetitive patterns takes about 4 hours for a down-sampled facade texture. The texture synthesis takes about 6 minutes. About 30 meshes were remodeled containing about 60 buildings as the most typical examples from the city. A few sampling results are shown in FIG. 10, where each column represents an example. From top to bottom in FIG. 10 illustrates an existing approximate model, an existing textured model, a remodeled geometry, and final result respectively for the respective Column examined.

The systems and methods described herein method proves to be both robust and efficient. The framework is open to integrate other sources of data of buildings. Each detected element can be further geometrically remodeled if more details are required. The operation opx of leaf node cx are defined to be "carving" if the reconstructed 3D points bounded by the region of cx are behind the building plane. A detailed element model can be placed at the specified position and depth. The extracted grammar rules cannot only be used for remodeling existing buildings, but also be potentially used to generate a pure synthetic building by edition and combination of the grammar rules. To generate a model of a non-existing building, first select a 3D grammar rule from _3D, then select one 2D layout rule for each facade plane from _WR generating several regions. After that, select the rules from _SR for each wall region. The parameters can be either randomly generated or manually specified.

An automatic method is provided that remodels a building or other structures/shapes from an existing approximate model and input images at ground level. Buildings are represented by grammar rules, which are extracted from the input data of 3D model and images. The repetitive pattern discovery from the orthographic texture image is more general and robust than the previous template-matching based methods. The final texture synthesis from learned rules determines the missing of textures due to limited viewing range of cameras in the previous image-based methods. As the methodology is general and able to integrate other sources of data of buildings, 3D scan data can be integrated to further augment geometry details. Another aspect is learning the grammar rules from a more detailed 3D mesh model.

Figure 11:
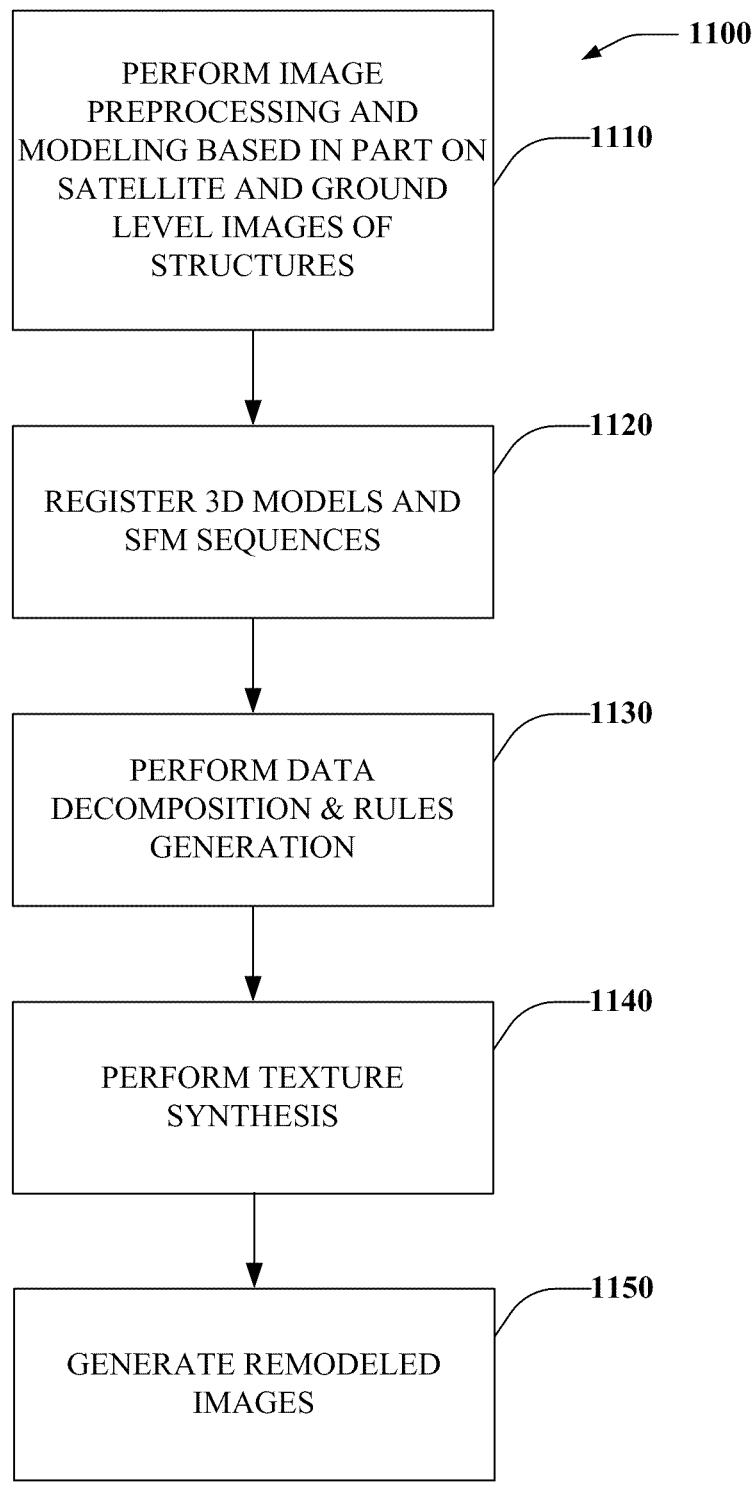
FIG. 11 illustrates an example methodology for remodeled buildings.

FIG. 11 is a flow diagram illustrating a process 1100 that facilitates automated architectural modeling. In view of the example systems described above, example methodologies can be implemented in accordance with the disclosed subject matter and can be better appreciated with reference to flowcharts described herein. For purposes of simplicity of explanation example methods are presented and described as a series of acts; however, it is to be understood and appreciated that the various embodiments are not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram, or interaction diagram. Moreover, not all illustrated acts may be required to implement a methodology in accordance with the subject specification. Additionally, it should be further appreciated that the methodologies disclosed hereinafter and throughout this specification are capable of being stored on an article of manufacture to facilitate transporting and transferring such methodologies to computers for execution by a processor or for storage in a memory.

Proceeding to 1110 of the process 1100, one or more satellite images of building structures and one or more ground-level images associated with the building structures are received and processed. At 1120, three-dimensional models and structure from motion sequences from the satellite images and the ground-level images are registered as previously described. At 1130, the three-dimensional models and structure from motion sequences are decomposed into building components. At 1140, rules (e.g., texture or mesh rules) are automatically generated from the building components to facilitate remodeled imaging of the building structures. Other aspects include performing a building texture synthesis in accordance with the rules. At 1150, at least one remodeled building image is automatically generated based in part on the building texture synthesis. In another aspect, the process 1100 can include generating one or more contain rules to facilitate remodeled imaging of the building structures, wherein positions and regions of descending shapes are explicitly defined. This can also include defining properties that are shared by the descending shapes.

Figure 12:
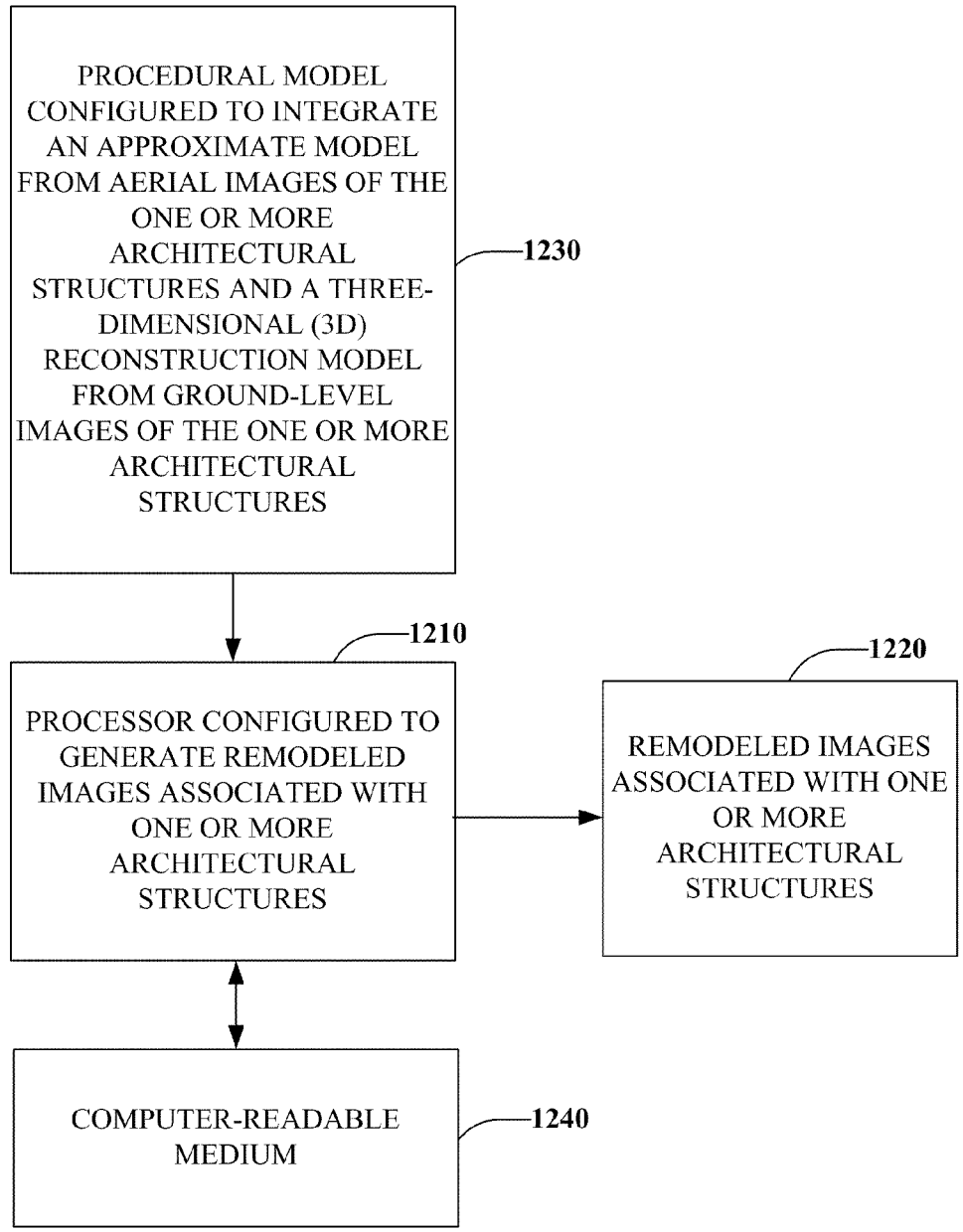
FIG. 12 illustrates an example system for generating remodeled images of buildings or other structures.

FIG. 12 illustrates an example modeling system 1200 for generating remodeled images of buildings or other structures and shapes. The system 1200 includes a processor 1210 configured to generate remodeled images 1220 associated with one or more architectural structures. A procedural model 1230 is configured to integrate an approximate model from aerial images of the one or more architectural structures and a three-dimensional (3D) reconstruction model from ground-level images of the one or more architectural structures. As will be described in more detail below with respect to FIG. 13, the processor 1210 receives instructions to automatically generate the remodeled images, wherein the one or more architectural structures can be associated with building facades. The system 1200 can also include a structure from motion (SFM) component (See component 130 of FIG. 1) to support the procedural model 1230. The system 1200 can also include a registration component (See component 150 of FIG. 1) to analyze the SFM component and the procedural model 1230.

The system 1200 can also include a decomposition component (See component 160 of FIG. 1) to isolate components of building structures. In another aspect, the system 1200 can include a first rules component (See component 170 of FIG. 1) that derives mesh rules from the decomposition component. In yet another aspect, the system 1200 can include a second rules component (See component 180 of FIG. 1) that derives texture rules from the decomposition component. In yet another aspect, the system 1200 can include a synthesis component (See component 190 of FIG. 1) to determine texture from one or more automatically generated rules, wherein the synthesis component generates one or more remodeled images 1220 of shapes or building structures. In another aspect, the processor 1210 determines one or more contain rules to generate the remodeled images, wherein the processor employs one or more computer generated architecture (CGA) grammar rules to generate the remodeled images. The processor can also detect repetitive images in a façade texture image.

Figure 13:
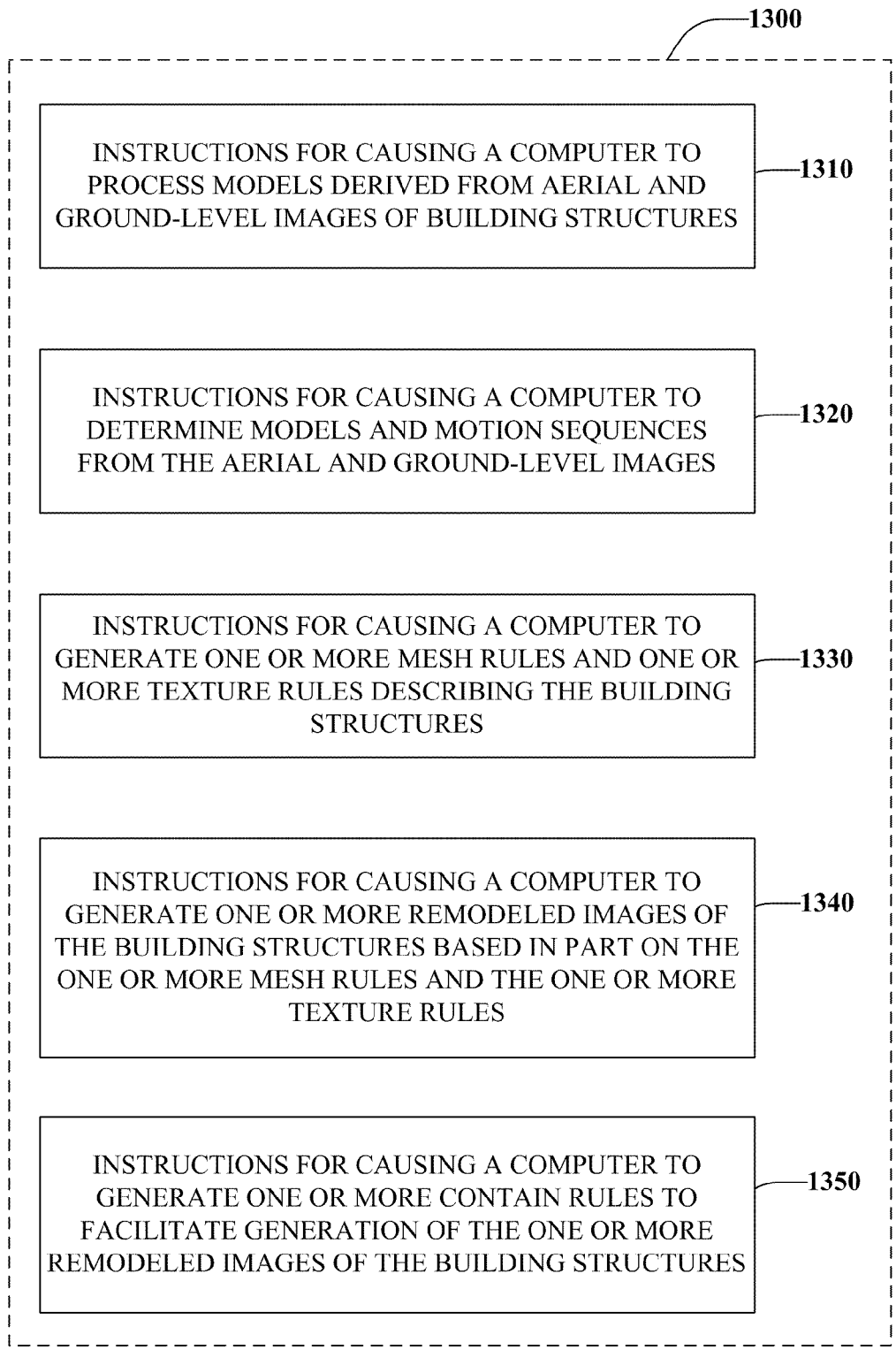
FIG. 13 illustrates an example computer-readable medium of instructions for causing a computer to generate images of remodeled buildings or other structures.

FIG. 13 illustrates an example computer-readable medium 1300 of instructions for causing a computer to generate images of remodeled buildings or other structures. The computer-readable medium 1300 includes instructions 1310 for causing a computer to process models derived from aerial and ground-level images of building structures. This includes instructions 1320 for causing a computer to determine models and motion sequences from the aerial and ground-level images. This also includes instructions 1330 for causing a computer to generate one or more mesh rules and one or more texture rules describing the building structures. This includes instructions 1340 for causing a computer to generate one or more remodeled images of the building structures based in part on the one or more mesh rules and the one or more texture rules. This also includes instructions 1350 for causing a computer to generate one or more contain rules to facilitate generation of the one or more remodeled images of the building structures.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nanoscale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

What has been described above includes examples of systems and methods that provide advantages of the subject innovation. It is, of course, not possible to describe every conceivable combination of components or methodologies for purposes of describing the claimed subject matter, but one of ordinary skill in the art may recognize that many further combinations and permutations of the various embodiments described herein are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A modeling system, comprising:
a procedural model configured to receive an approximate three-dimensional (3D) model generated from one or more aerial images of an architectural structure and generate a 3D reconstruction model from one or more ground-level images of the architectural structure; and
a processor configured to generate a remodeled image associated with the architectural structure as a function of a set of contain rules that defines a hierarchical relationship for a set of structure elements contained in a region of the architectural structure, a set of shape grammar rules determined based on structural information associated with the approximate 3D model and at least one different approximate 3D model, textural information associated with the approximate 3D model and different textural information associated with the 3D reconstruction model, wherein the textural information and the different textural information are synthesized with the set of shape grammar rules to generate the remodeled image, wherein a structure element from the set of structure elements is associated with the region of the architectural structure and a position with respect to one or more other structure elements related to the region, wherein the region and the position are defined by the set of contain rules, wherein the structure element is extracted from an automated bottom-up and top-down analysis of the one or more aerial images and the one or more ground-level images, and wherein descending structure elements in the hierarchical relationship with respect to the structure element are subdivided without a set of split grammar rules.

2. The system of claim 1, wherein the approximate 3D model is a 3D mesh model.

3. The system of claim 1, wherein the 3D reconstruction model is generated based at least in part on structure from motion (SFM) data that includes one or more 3D point clouds and one or more camera angles from the one or more ground-level images.

4. The system of claim 1, further comprising a registration component configured to associate the one or more ground-level images with the approximate 3D model.

5. The system of claim 1, further comprising a decomposition component configured to isolate one or more structure elements included in the set of structure elements.

6. The system of claim 1, further comprising a first rules component configured to derive one or more mesh rules from the approximate 3D model, wherein the one or more mesh rules include one or more building roof regions and one or more façade planes associated with the architectural structure.

7. The system of claim 6, further comprising a second rules component configured to derive one or more texture rules from the 3D reconstruction model, wherein the one or more texture rules include repetitive structure elements in the one or more façade planes associated with the architectural structure.

8. The system of claim 7, further comprising a synthesis component configured to determine the textural information from the one or more mesh rules and the different textural information from the one or more texture rules.

9. The system of claim 8, wherein the synthesis component is configured to generate one or more remodeled structure elements for the remodeled image.

10. The system of claim 1, wherein the set of contain rules defines a visibility priority value for the structure elements.

11. The system of claim 1, wherein the set of shape grammar rules includes one or more computer generated architecture (CGA) grammar rules to generate the remodeled image, wherein the one or more CGA grammar rules define at least the set of structure elements contained in the region of the architectural structure.

12. The system of claim 1, wherein overlapping structure elements of the set of structure elements are grouped to form a combined structure element.

13. A method, comprising:
receiving, by a device comprising a processor, one or more ground-level images associated with a building structure;
receiving, by the device, a three-dimensional model generated based on one or more satellite images associated with the building structure and at least one other three-dimensional model generated based on one or more other satellite images associated with one or more other building structures;
generating, by the device, one or more three-dimensional structures based on the one or more ground-level images;
determining, by the device, a set of shape grammar rules based on structural information associated with the three-dimensional model and the at least one other three-dimensional model;
determining, by the device, a set of contain rules that defines a hierarchical relationship for a set of structure elements included in a region of the building structure, a structure element from the set of structure elements being associated with the region of the building structure and a position with respect to one or more other structure elements related to the region, the region and the position being defined by the set of contain rules, the structure element being extracted from an automated bottom-up and top-down analysis of the one or more satellite images and the one or more ground-level images, and descending structure elements in the hierarchical relationship with respect to the structure element being subdivided without a set of split grammar rules;
determining, by the device, textural information based on the three-dimensional model;
determining, by the device, other textural information based on the one or more three-dimensional structures; and
employing, by the device, the set of shape grammar rules, the set of contain rules, the textural information and the other textural information to facilitate remodeled imaging of the building structure.

14. The method of claim 13, wherein the determining the textural information includes determining the textural information based on one or more mesh rules determined from the three-dimensional model, and wherein the determining the other textural information includes determining the other textural information based on one or more texture rules determined from the one or more three-dimensional structures.

15. The method of claim 14, further comprising generating, by the device, at least one remodeled building image based in part on the one or more mesh rules and the one or more texture rules.

16. The method of claim 13, wherein the determining the set of shape grammar rules includes determining one or more computer generated architecture (CGA) grammar rules.

17. The method of claim 13, further comprising defining, by the device, bounding box coordinates for the region of the building structure.

18. The method of claim 13, further comprising defining, by the device, one or more characteristics that are shared by the one or more structure elements of the set of structure elements.

19. A non-transitory computer-readable medium comprising instructions that, in response to execution, cause a system comprising a processor to perform operations, the instructions comprising:

instructions for causing a computer to process at least one ground-level image of at least one building structure, at least one model derived from at least one aerial image of the at least one building structure, and at least one other model derived at least one other aerial image of at least one other building structure;

instructions for causing the computer to generate at least one other model in accordance with at least one motion sequence associated with the at least one ground-level image;

instructions for determining a set of shape grammar rules based on structural information associated with the at least one model and the at least one other model;

instructions for determining a set of contain rules that defines a hierarchical relationship for a set of architectural elements associated with a region of the at least one building structure, wherein an architectural element from the set of architectural elements is associated with the region of the at least one building structure and a position with respect to one or more other architectural elements within the region, wherein the region and the position are defined by the set of contain rules, wherein the structure element is extracted from an automated bottom-up and top-down analysis of the at least one aerial image and the at least one ground-level image, and wherein descending structure elements in the hierarchical relationship with respect to the structure element are subdivided without a set of split grammar rules;

instructions for causing the computer to determine texture data based on the at least one model;

instructions for causing the computer to determine different texture data based on the at least one other model; and instructions for causing the computer to generate at least one remodeled image of the at least one building structure based at least in part on the set of contain rules, wherein the texture data and the different texture data are synthesized with the set of shape grammar rules to generate the at least one remodeled image.

20. The non-transitory computer-readable medium of claim 19, wherein the texture data is determined based on at least one mesh rule associated with the at least one model and the different texture data is determined based on at least one texture rule associated with the at least one other model.

* * * * *